T. J. GOOCH.
STEAM COOKER.
APPLICATION FILED SEPT. 11, 1917.

1,297,832.

Patented Mar. 18, 1919.

T. J. Gooch
Inventor

UNITED STATES PATENT OFFICE.

TERRY J. GOOCH, OF LEWISBURG, NORTH CAROLINA.

STEAM-COOKER.

1,297,832. Specification of Letters Patent. Patented Mar. 18, 1919.

Application filed September 11, 1917. Serial No. 190,803.

*To all whom it may concern:*

Be it known that I, TERRY J. GOOCH, a citizen of the United States, residing at Lewisburg, in the county of Franklin and State of North Carolina, have invented a new and useful Steam-Cooker, of which the following is a specification.

The present invention appertains to steam cookers, and aims to provide a novel and improved appliance of that character of general utility for cooking or steaming vegetables, fruits, meats, etc.

It is the object of the invention to provide a steam cooker comprising a novel assemblage of the component elements, whereby the device is thoroughly practical and efficient in use, the cooker being readily set over a gas burner, stove or other source of heat.

Another object of the invention is the provision of means for giving a signal when the water level lowers near a dangerous point, so that the supply of water can be replenished to avoid burning or injury to the device and its contents.

With the foregoing and other objects in view, which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

The invention is illustrated in the accompanying drawings, wherein.

Figure 1:
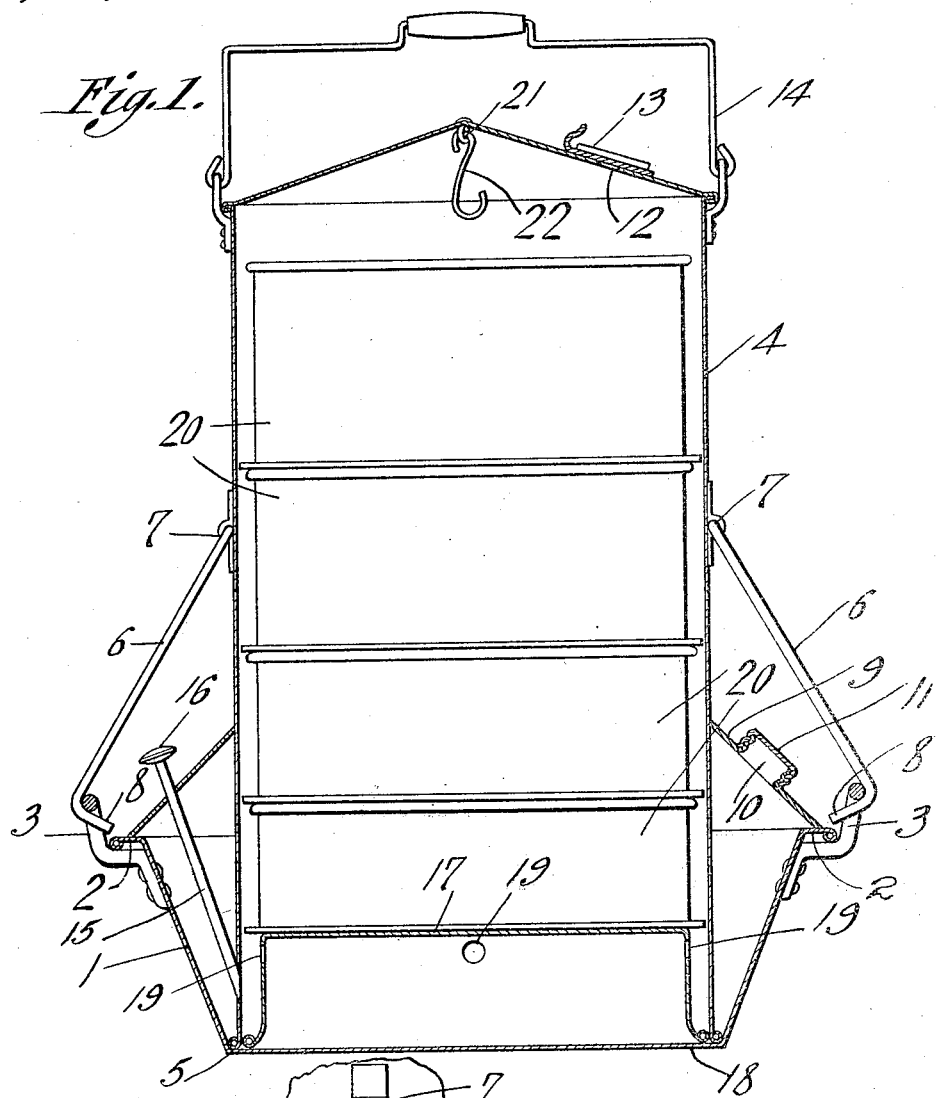
Figure 1 is a median diametrical section of the cooker, portions being shown in elevation.
Figure 2:
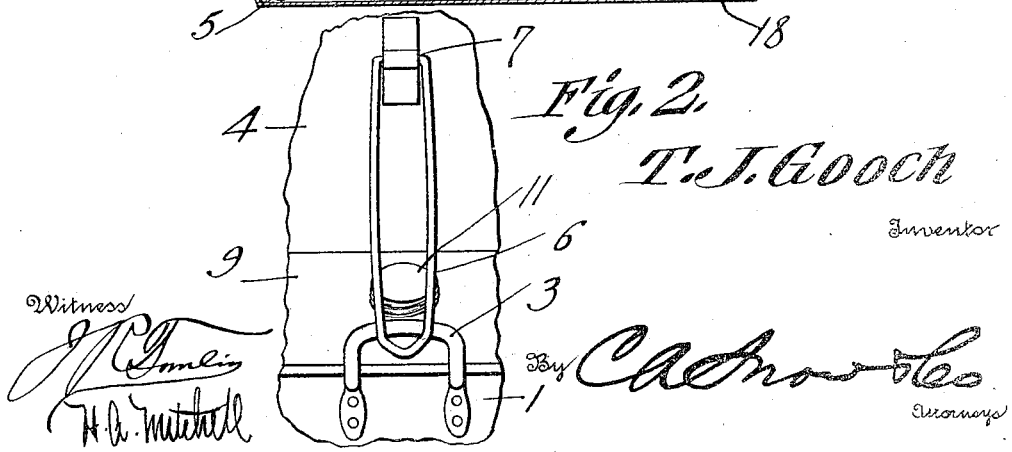
Fig. 2 is a fragmental elevation illustrating one of the latches.

In carrying out the invention, there is employed a pan 1, serving as a water boiler, having an inclined or flared rim provided at its edge with an outturned flange 2, and diametrically opposite arched handles 3 are secured to the rim of the pan or boiler 1 for lifting and carrying it.

Supported by the pan 1 is an upstanding cylindrical casing or dome 4 which is of suitable sheet metal, as well as the pan 1, the upper end of the casing being closed and its lower end open, and provided with an outstanding annular bead 5 to seat on the bottom of the pan next to the rim, and thereby center the casing in the pan. Diametrically opposite loop-shaped latches 6 bent from wire are pivoted, as at 7, to the wall of the casing 4, and are provided at their free ends with hooks 8 arranged to move snugly under the handles 3, to thereby fasten the casing down on the pan. The casing 4 is provided between its ends with an outstanding annular sloping apron 9, the outer edge of which is seatable on the flange 2 of the pan 1, to close the annular space between the casing and rim of the pan, and to also assist in supporting the casing. This apron 9 is clamped down on the flange 2 when the latches 6 are swung into engagement with the handles 3, that serve as keepers for said latches. The apron 9 is provided at one point with a filling opening 10 normally closed by a removable cap 11, permitting water to be poured into the pan when said cap is removed. The top of the casing 4 has a steam outlet aperture 12 controlled by a sliding valve 13 to regulate the discharge of steam, and a bail 14 is pivotally connected with the upper end of the casing for lifting and carrying it.

As a means for giving an audible signal when the water level within the pan 1 lowers to a predetermined dangerous point, a tube 15 extends through the apron 9 and is attached to the casing 4 near its lower end to communicate with the pan at the desired water level therein, and a whistle 16 or other equivalent signal device is attached to the upper end of the tube. When the water level is above the lower end of the tube 15, this will seal the lower end of said tube against the flow of steam therethrough, but when the water level lowers to the lower end of said tube, the steam can pass up the tube and blow the whistle 16, giving the signal, so that the water in the pan can be replenished.

Seated on the bottom of the pan 1 within the casing 4 is an inverted pan-shaped base 17 having the outstanding bead 18 at its edge to contact with the casing 4 and center said base within the same. This base 17 is provided in its peripheral wall near its top with apertures 19 for the flow of water and steam therethrough.

In using the cooker, supposing that the casing 4 is removed from the pan 1, the base 17 is placed in the pan, and the material to be cooked or steamed is supported by said base. For example, if vegetables, fruits or the like are to be cooked or steamed in jars, the jars are supported in superposed tiers on the base, as will be readily understood. Superposed receptacles 20 for different vegetables, fruits, meats, and the like, can also be supported on the base. The casing 4 is then lowered over the receptacles, jars, or the like, seated on the base, and the latches 6 engaged with the handles 3, thereby fastening the pan and casing together with the casing inclosing the materials. The cooker can then be readily lifted or carried by the bail 14, and placed over a gas burner, oil heater, stove or other source of heat to boil the water in the pan. The base 17 in surrounding the body of water immediately above the bottom of the pan will result in said water heating quickly, the steam passing upwardly through the apertures 19 into the casing 4 and flowing upwardly around and within the receptacles 20 to thoroughly steam and cook the contents thereof. The valve 13 can be opened to let the steam escape, or can be closed to retain the steam within the cooker, and conserve the heat. The top of the casing has a depending eye 21 for supporting a hook 22 from which a ham or other object can be suspended within the casing to be steamed.

Having thus described the invention, what is claimed as new is:

A steam cooker comprising a pan having an annular flange, opposed handles extending therefrom, an inverted pan-shaped base upon the bottom of the pan and having an apertured wall, a casing having an open bottom and a closed top, said casing being removably seated in the pan between the inverted pan-shaped base and the wall of the pan, a downwardly flared apron upon the casing and adapted to rest upon the flange, opposed latches upon the casing for engaging the handles to hold the casing and pan assembled, said apron having a filling opening, and a vent tube connected to the lower portion of the casing and extending through the apron.

In testimony that I claim the foregoing as my own, I have hereto affixed my signature in the presence of two witnesses.

TERRY J. GOOCH.

Witnesses:
MONROE E. MILLER,
I. E. SIMPSON.

Copies of this patent may be obtained for five cents each, by addressing the "Commissioner of Patents, Washington, D. C."